(12) United States Patent
Nieuwland

(10) Patent No.: US 10,213,710 B2
(45) Date of Patent: Feb. 26, 2019

(54) FILTER ASSEMBLY

(71) Applicant: NTF HOLDING B.V., Maasluis (NL)

(72) Inventor: Pierre Gerard Willem Nieuwland, Maasluis (NL)

(73) Assignee: NTF Holding B.V., Maassluis (NL)

( * ) Notice: Subject to any disclaimer, the term of this patent is extended or adjusted under 35 U.S.C. 154(b) by 295 days.

(21) Appl. No.: 14/897,240

(22) PCT Filed: Jun. 10, 2014

(86) PCT No.: PCT/IB2014/001016
§ 371 (c)(1),
(2) Date: Dec. 10, 2015

(87) PCT Pub. No.: WO2014/199215
PCT Pub. Date: Dec. 18, 2014

(65) Prior Publication Data
US 2016/0107109 A1    Apr. 21, 2016

(30) Foreign Application Priority Data

Jun. 11, 2013  (NL) ..................................... 1040244

(51) Int. Cl.
*B01D 29/05*    (2006.01)
*B01D 29/56*    (2006.01)
(Continued)

(52) U.S. Cl.
CPC ............. *B01D 29/56* (2013.01); *B01D 29/05* (2013.01); *B01D 35/0273* (2013.01); *F01M 11/03* (2013.01)

(58) Field of Classification Search
CPC ........ B01D 29/03; B01D 29/05; B01D 29/56; B01D 35/0273; F01M 11/03
See application file for complete search history.

(56) References Cited

U.S. PATENT DOCUMENTS 5,494,575 A    2/1996  Kitajima et al.
5,817,236 A *  10/1998 Chiba ................ B01D 35/0273
                                                          210/344

(Continued)

OTHER PUBLICATIONS

International Search Report for related PCT Application No. PCT/IB2014/001016; dated Dec. 23, 2014.

*Primary Examiner* — David C Mellon
(74) *Attorney, Agent, or Firm* — Troutman Sanders LLP; Ryan A. Schneider; Christopher C. Close, Jr.

(57) ABSTRACT

Filter assembly for a liquid medium comprising a two-piece filter housing having a first and a second housing part with a first and second end wall respectively, surrounded by a circumferential wall, said housing parts accommodating in the space defined between the end walls three layers of filter material, and with a spacer in-between having an open structure with upstanding ribs defining chambers there between and having two end planes which define abutment planes for two layers of filter material and with a passage crosswise to the plane thereof, and with between the second layer of filter material and the second end wall a third layer of filter material, in which all three layers of filter material are discrete layers, the space between the third layer of filter material and the second end wall, and the chambers in the spacer, being in connection to the filter outlet, and the space between the first layer of filter material and the first end wall being connected to the filter inlet.

10 Claims, 3 Drawing Sheets

Figure 1:
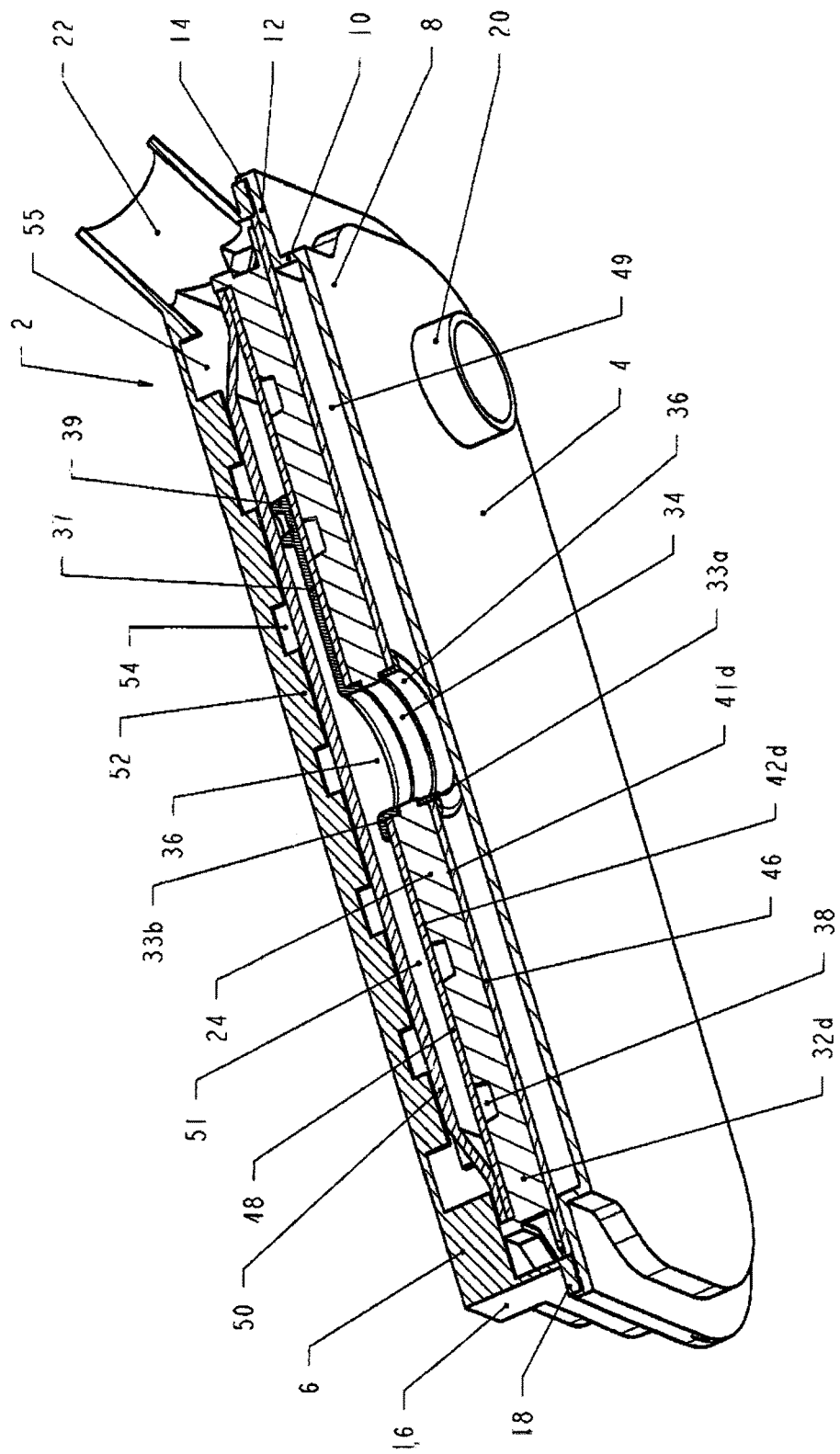

(51) Int. Cl.
*F01M 11/03* (2006.01)
*B01D 35/027* (2006.01)

(56) References Cited

U.S. PATENT DOCUMENTS

2009/0294343 A1 12/2009 Pekarsky et al.
2012/0012517 A1 1/2012 Khalil et al.

* cited by examiner

FILTER ASSEMBLY

CROSS-REFERENCE TO RELATED APPLICATIONS

This application is a US National Stage of International Application No. PCT/IB2014/001016, filed 10 Jun. 2014, which claims the benefit of Netherlands Application No. 1040244, filed on 11 Jun. 2013, both herein fully incorporated by reference.

The invention relates to a filter assembly for a liquid medium such as one including a filter housing made-up from a first and a second housing part, each of the housing parts having a first and second end wall respectively, and each of the housing parts having a circumferential wall surrounding the first and second end wall, respectively, the filter housing having an internal space defined by the end walls and extending to the end walls.

Such a filter assembly is known from US 2012/0012517 A.

In this known filter assembly the second and the third layer of filter material are constituted by the opposite walls of a flat rectangular sac of filter material of which the folding edge lies, together with one end of the spacer, at a distance from the neighbouring housing wall. Thus the second and the third filtering layer consist of the same material while the dimension of this sac perpendicular to the folding edge is, together with same of the spacer, smaller than the dimension of the housing in this direction.

The invention aims to improve this known filter assembly and more particularly to provide a filter assembly in which the dimensions of the filter housing are used optimally and a structure is obtained which is not only highly shock-resistant and which can operate with relatively high pressures but in which the designer has complete freedom in the choice of the material of the respective layers. Furthermore it is aimed to provide a filter assembly in which an optimal filtering is obtained with only a limited pressure drop across the layers of filter material and in which various layers with mutually different filter density can be used so that this filter is very flexible as to its practical use and can be adapted in a simple way to any specific use.

To this end the invention proposes a filter assembly such as defined in the main claim.

Preferred embodiments of this filter assembly are described in the sub-claims.

Figure 2:
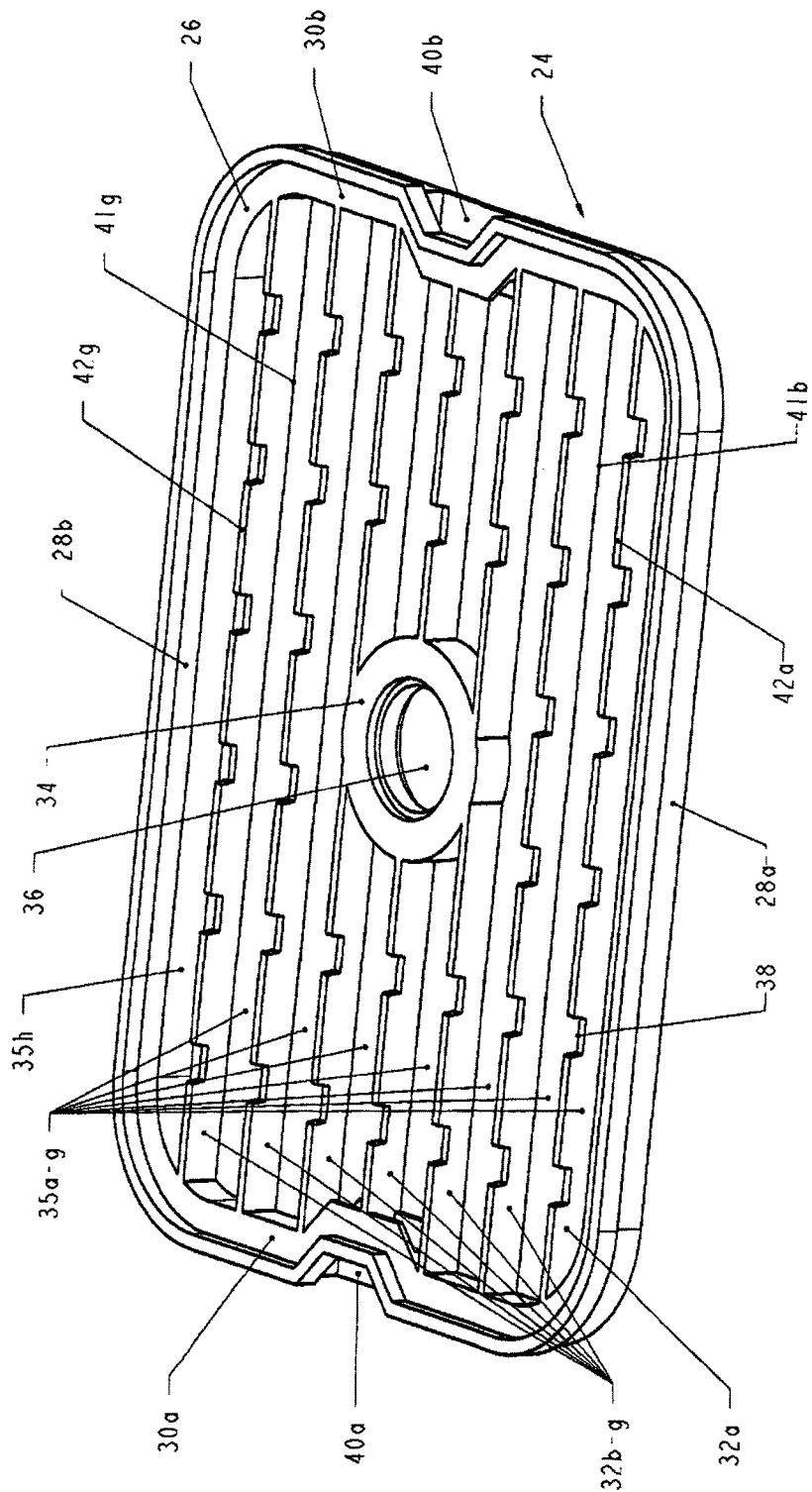
Figure 3:
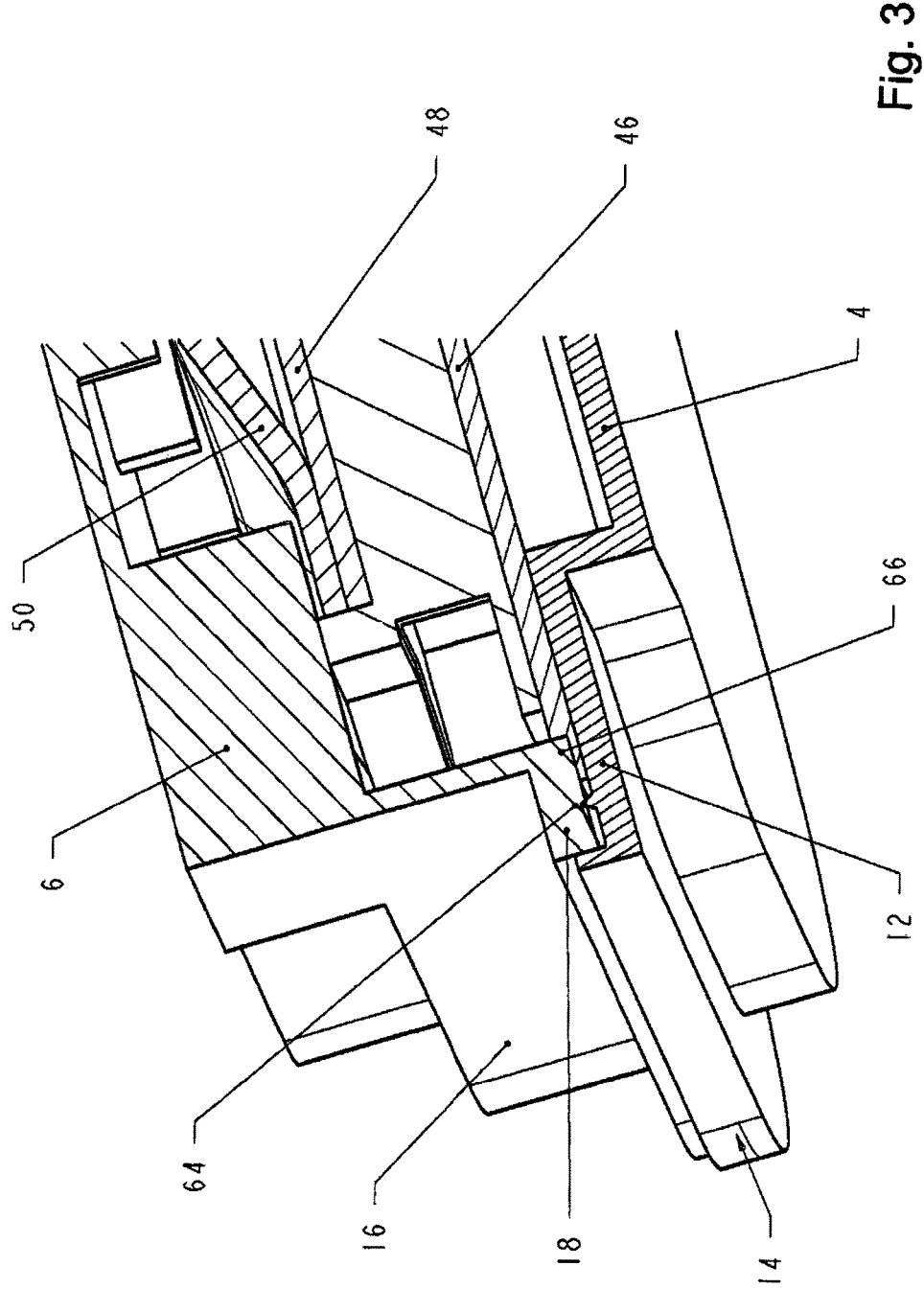

The invention is elucidated while referring to the drawings. Therein show:

FIG. 1 a partly cut-away end view of a preferred embodiment of the assembly according to the invention;

FIG. 2 a perspective upper view of the spacer, used therein;

FIG. 3 a cut-away end view and, more detailed, the connection between the end edges of the two house parts.

In FIG. 1 the filter assembly is in its whole denoted with reference numeral 2. It comprises a filter housing which is made up of a first, lower, house part 4 and a second house part 6, which is fixed thereto. The first, lower, house part 4 has an end wall 8 and a circumferential edge 10 which merges in an outwardly directed end flange 12 which also ends in an upstanding circumferential edge 14; the second housing part 6 has an upstanding circumferential edge 16 which ends in an outwardly directed end flange 18. See also FIG. 3.

The first housing part 4 carries a schematically indicated filter inlet 20 which ends in the end wall 8 and the second housing part 6 carries a filter outlet 22—details of these parts will be given below.

Within the filter assembly there is a spacer 24 which is in more detail shown in FIG. 2. This spacer has an enlarged circumferential rim 26 with the long sides 28*a*, 28*b* and the short sides 30*a*, 30*b*. Between the short sides 30*a*, 30*b* runs a number of upstanding longitudinal ribs 32*a* . . . 32*g* which are parallel to the long sides 28*a*, 28*b*. In the middle of this spacer 24 there is an upstanding ring 34 with a central opening 36; this ring interrupts the upstanding rib 32*d* and is connected with the ribs 32*c* and 32*e* which are next thereto.

Each of the ribs 32*a* . . . 32*g* is provided with a range of cut-outs 38. It is clear that the chambers 35*a* . . . 35*g* defined between the ribs 32*a* . . . 32*g* are mutually interconnected via these cut-outs 38.

In each of the short end sides 30*a*, 30*b* there is an opening 40*a*, 40*b* respectively and via these openings the chamber 35*a* . . . 35*g* between the ribs are interconnected with the surroundings of the spacer 24.

The lower edges 41*a* . . . 41*g* of the ribs 32*a* . . . 32*g* lie in one plane and the upper edges 42*a* . . . 42*g* lie also in one plane; both these planes define abutment planes for a respective layer of filter material—see FIG. 1.

FIG. 1 shows how this, lower, abutment plane, not indicated with a reference numeral and constituted by the lower edges 41*a* . . . 41*g* of the ribs 32*a* . . . 32*g* is an abutment plane for the first layer of filter material 46 while the upper edges 42*a* . . . 42*g* of these ribs constitute an abutment plane for the second layer of filter material which is indicated with 48. FIG. 1 shows how there is a third layer of filter material, indicated with reference numeral 50, and lying at a distance above the second layer of filter material 48. This third layer of filter material 50 is supported during operation by ribs 52 which protrude from the inner side of the second housing wall 6. Between these ribs 52 there are in-between spaces so that the filtered medium can freely circulate in the space above the third filter material layer 50.

Two retaining rings 33*a*, 33*b*, each one having an L-shaped cross-section, fit closely on the respective ends of the ring 34; they each enclose with their end edge the filter material 46 and 48 respectively. From the upper ring 33*b* extends a number of radial thin arms 37 which each carry a spacer 39 supporting the third layer of filter material 50.

As particularly FIGS. 1 and 2 show the chambers 35 between the ribs 32*a* . . . 32*g* with the space 54 above the third filter material 50 are connected with the filter outlet 22—the passage 40*b* gives a direct connection and the passage 40*a* gives a connection via the space 54.

The user is completely free in his choice of the filter material for the first, second and third layer respectively; it is for instance possible that one uses for the first filter layer 46 a material with a high filter density and for the second and third layers 48 and 50 respectively a material with a lower filter density, thus a more coarse filter material.

The circumferential edges of the three layers of filter material 46, 48 and 50 are sealed with respect to each other so that the medium to be filtered (generally oil) which enters via the inlet 20 and then reaches the space 49 beneath the first layer of filter material 46 can choose between the following paths:

a. from the space 49 through the first filter material 46 directly to the chambers 35 between the ribs 32*a* . . . 32*g* and from there via the outlet passage 40*b* to the outlet 22;

b. via the central passage 36 to a space 51 between the second filter layer 48 and the third filter layer 50 and from there:
  either via the second filter layer 48 to the above-mentioned chambers 35 and from there to the outlet 22 or
  via the third filter layer 50 to the chambers 54 and from there to the outlet 22.

As there are three different current paths in combination with the possibility to influence the choice there between by the choice of the three used filter materials properties, to be chosen at will, in combination with the configuration of the spacer the user can realize various filter properties so that for each use an optimal filter can be designed.

FIG. 3 shows in detail the way in which the first housing part 4 and the second housing part 6 are preferably interconnected. The upstanding end edge 14 of the first housing part 4 encloses the flange 18 of the second housing part 6 and these parts are at the position of the point-shaped enlargement 64 on the flange 12 interconnected by means of vibration welding. During this operation the first layer of filter material 46 is pushed inwardly namely in that part which is indicated in the drawing by hatching. In this way is ensured that waste, which is produced by the welding, can never reach the "clean" zone of the filter so that pollution of already filtered oil is impossible. However it will be clear that other ways of interconnecting the housing parts, such as gluing and High Frequency welding can also be used.

The invention claimed is:

1. Filter assembly for a liquid medium comprising a filter housing made-up from a first and a second housing part, each of the housing parts having a first and second end wall respectively, and each of the housing parts having a circumferential wall, which surrounding the first and second end wall, respectively, the filter housing having an internal space defined by the end walls and extending to the circumferential walls;
  wherein the first and second housing parts in combination surround a first, a second and a third layer of filter material located in the internal space;
  wherein one of the first and second housing parts of the filter assembly further has an outlet, while the other of the first and second housing parts further has an inlet for the medium;
  wherein within this the internal space is located a spacer element with an open structure and upstanding ribs between which chambers are defined, interconnected via cut-outs in the ribs;
  in which respective end edges of the ribs define a first and a second end plane, which first end plane defines a first abutment plane for the first layer of filter material and which second end plane defines a second abutment plane for the second layer of filter material;
  a fluid passage being provided through the spacer element and the first and second layers of filter material, crossing respective main planes thereof;
  wherein the first layer of filter material is lying between the first abutment plane and the first end wall;
  wherein the second layer of filter material is lying between the second abutment plane and the second end wall;
  wherein the third layer of filter material is lying between the second layer of filter material and the second end wall;
  wherein a space between the third layer of filter material and the second end wall, and the chambers in the spacer element, are in connection with the outlet of the filter assembly;
  wherein a space between the first layer of filter material and the first end wall is connected to the inlet of the filter assembly;
  wherein the spacer element extends across the entire internal space of the filter housing;
  wherein the respective second and third layers of filter material each constitute a discrete, independent layer of which the respective end edges are sealingly interconnected; and
  wherein the second and third layers extend, together with the spacer element, across the entire internal space of the filter housing.

2. The assembly according to claim 1, wherein the circumferential wall of the first housing part merges in a first, outwardly directed end flange which merges in an upstanding circumferential edge, the circumferential wall of the second housing part merges in a second, also outwardly directed end flange which lies within this upstanding circumferential edge, the first layer of filter material extends to between the first and the second end flange and these end flanges are interconnected by welding.

3. The assembly according to claim 1, wherein all of the filter layers have mutually different filter densities;
  wherein the first filter layer has the highest density.

4. The assembly according to claim 1, wherein spacers are accommodated between the second and the third layers of filter material.

5. A filter assembly comprising:
  a filter housing having:
    an internal space defined by end walls and extending to circumferential walls;
    an inlet communicative from outside the filter assembly to the internal space; and
    an outlet communicative from the internal space to outside the filter assembly;
  a spacer element with an open structure and upstanding ribs between which chambers are defined, interconnected via cut-outs in the ribs;
  a first layer of filter material;
  a second layer of filter material; and
  a third layer of filter material;
  wherein respective end edges of the ribs of the spacer element define a first and a second end plane, which first end plane defines a first abutment plane for the first layer of filter material and which second end plane defines a second abutment plane for the second layer of filter material;
  wherein the third layer of filter material is located between the second layer of filter material and an end wall of the filter housing;
  wherein the spacer element extends across the entire internal space of the filter housing and the second and third layers of filter material each constitute a discrete, independent layer of which respective end edges are sealingly interconnected and which second and third layers of filter material extend, together with the spacer element, across the entire internal space of the filter housing;
  wherein a first distribution space is defined between the inlet and the first layer of filter material;
  wherein a second distribution space is defined between the second layer of filter material and the third layer of filter material; and wherein the filter assembly is configured so that pressure in the first distribution space is substantially equal to the pressure of the second distribution space when filtering media therethrough.

6. The filter assembly according to claim 5, wherein a fluid passage is provided through the spacer element and the first and second layers of filter material, crossing respective main planes thereof;
wherein the first layer of filter material lies between the first abutment plane and an end wall of the filter housing;
wherein the second layer of filter material lies between the second abutment plane and the second end wall; and
wherein a space between the third layer of filter material and an end wall of the filter housing, and the chambers in the spacer element, are in connection with the outlet.

7. The assembly according to claim 6, wherein the filter housing comprises a first and a second housing part;
wherein the end walls defining the internal space comprise a first and second end wall, the first housing part incorporating the first end wall and the second housing part incorporating the second end wall;
wherein each of the housing parts having a circumferential wall surrounding the first and second end wall, respectively; and
wherein the circumferential wall of the first housing part merges in a first, outwardly directed end flange which merges in an upstanding circumferential edge, the circumferential wall of the second housing part merges in a second, also outwardly directed end flange which lies within this upstanding circumferential edge, the first layer of filter material extends to between the first and the second end flange and these end flanges are interconnected by welding.

8. The assembly according to claim 7, wherein all of the filter layers have mutually different filter densities.

9. The assembly according to claim 8, wherein spacers are accommodated between the second and the third layers of filter material.

10. A filter assembly for a liquid medium comprising:
an inlet communicative from outside the filter assembly into an internal space of the filter assembly;
a first layer of filter material in the internal space;
a spacer element in the internal space;
a second layer of filter material in the internal space;
a third layer of filter material in the internal space; and
an outlet communicative from the internal space of the filter assembly to outside the filter assembly;
wherein a first distribution space for liquid medium is defined between the inlet and the first layer of filter material;
wherein a second distribution space for liquid medium is defined between the second layer of filter material and the third layer of filter material;
wherein the first distribution space and the second distribution space are in fluid communication via a distribution space passage through each of the first layer of filter material, the spacer element, and the second layer of filter material;
wherein the spacer element is located between the first layer of filter material and the second layer of filter material;
wherein the spacer element has a bottom face and a top face, each face having ribs extending therefrom between which chambers are defined, interconnected via cut-outs in the ribs;
wherein the bottom face of the spacer element receives a flow of liquid medium from the first distribution space up through the first layer of filter material;
wherein the top face of the spacer element receives a flow of liquid medium from the second distribution space down through the second layer of filter material; and
wherein between the inlet and the outlet of the filter assembly are defined three separate flow paths:
a first flow path from the first distribution space through the first layer of filter material, through the spacer element, and toward the housing exit;
a second flow path from the first distribution space, through the distribution space passages to the second distribution space, through the second layer of filter material, through the spacer element, and toward the housing exit; and
a third flow path from the second distribution space, through the third layer of filter material, and toward the housing exit.

* * * * *